United States Patent [19]

Shigeo et al.

[11] Patent Number: 4,631,015

[45] Date of Patent: Dec. 23, 1986

[54] MOLDING APPARATUS WITH REPLACEABLE PLUNGER AND DIE SET

[75] Inventors: Iwasaki Shigeo; Haguchi Hiroshi, both of Okayama, Japan

[73] Assignee: Mitsuishi Fukai Tekkosho, Ltd., Bizen, Japan

[21] Appl. No.: 261,221

[22] Filed: May 8, 1981

[51] Int. Cl.[4] .......................... B30B 9/04; B30B 9/28; B29C 43/00

[52] U.S. Cl. .................................... 425/195; 100/244; 100/246; 100/252; 100/264; 100/918; 425/78; 425/352

[58] Field of Search ............... 425/352, 353, 354, 355, 425/356, 359, 193, 195, 192, 78; 100/918, 244, 264, 246, 252; 72/419, 448, 481

[56] References Cited

U.S. PATENT DOCUMENTS

| | | | |
|---|---|---|---|
| 372,262 | 10/1887 | Hart | 72/481 |
| 866,999 | 9/1907 | Auram | 425/354 |
| 3,143,413 | 8/1964 | Krapf | 425/352 |
| 3,153,833 | 10/1964 | Jackson | 425/356 |
| 3,561,056 | 2/1971 | Smith et al. | 425/195 |
| 3,593,366 | 7/1971 | Smith | 425/195 |
| 3,610,021 | 10/1971 | Hopper | 100/918 |
| 3,794,458 | 2/1974 | Iwasaki | 425/353 |
| 4,412,800 | 11/1983 | Dorsey | 425/195 |

*Primary Examiner*—Willard E. Hoag

*Attorney, Agent, or Firm*—Wenderoth, Lind & Ponack

[57] ABSTRACT

A molding machine for making bricks, etc. having a mold open on both ends and opposed plungers for cooperation with the mold, the mold and plungers being removable and replaceable as a set.

2 Claims, 5 Drawing Figures

MOLDING APPARATUS WITH REPLACEABLE PLUNGER AND DIE SET

This invention relates to a forming maching for bricks, etc. The invention provides a new concept in reducing the excessively long time required for changing metallic molds in the conventional brick forming machines in order to achieve higher efficiency in brick production.

TECHNICAL BACKGROUND

In a conventional brick forming machine, the metallic mold sits on the metallic mold support and receives the brick material into its inside. The upper plunger is driven by a hydraulic cylinder placed on the upper center of the machine to press the brick material in the metallic mold between itself and the stationary lower plunger. The metallic mold support is driven by hydraulic cylinders mounted on the right and left columns of the machine to fasten the metallic mold while the brick is being pressed.

Every time the shape or size of the bricks being formed are changed, the metallic mold, and the upper and lower plungers have to be changed. While they are being changed, the forming operation is interrupted, and the time needed for the change is long. The production efficiency is, therefore, low in general as compared with the conventional brick forming machines.

DISCLOSURE OF INVENTION

In the present invention a new technical concept for the forming machines for bricks, etc. is presented, in which a combination of a metallic mold and upper and lower plungers with a certain dimension can be together rapidly put into the metallic mold support and also withdrawn to introduce into the metallic mold support different combinations of metallic mold and upper and lower plungers.

The forming machine for bricks, etc. according to the invention is described in detail hereinafter in connection with embodiments of the invention and as shown in the accompanying drawings, in which.

Figure 1:
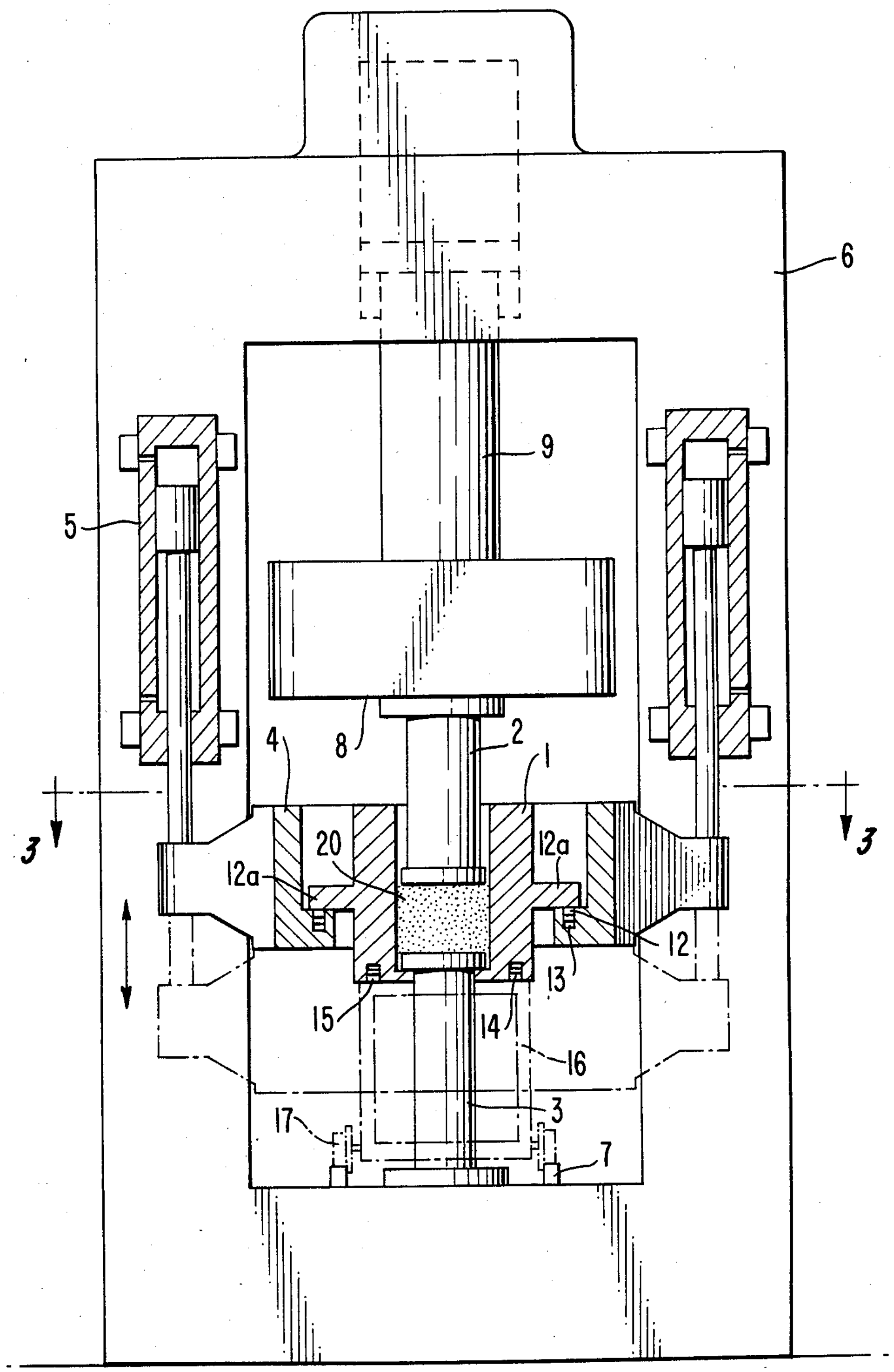
FIG. 1 is a partial cross-sectional elevation of an embodiment of the invention.
Figure 2:
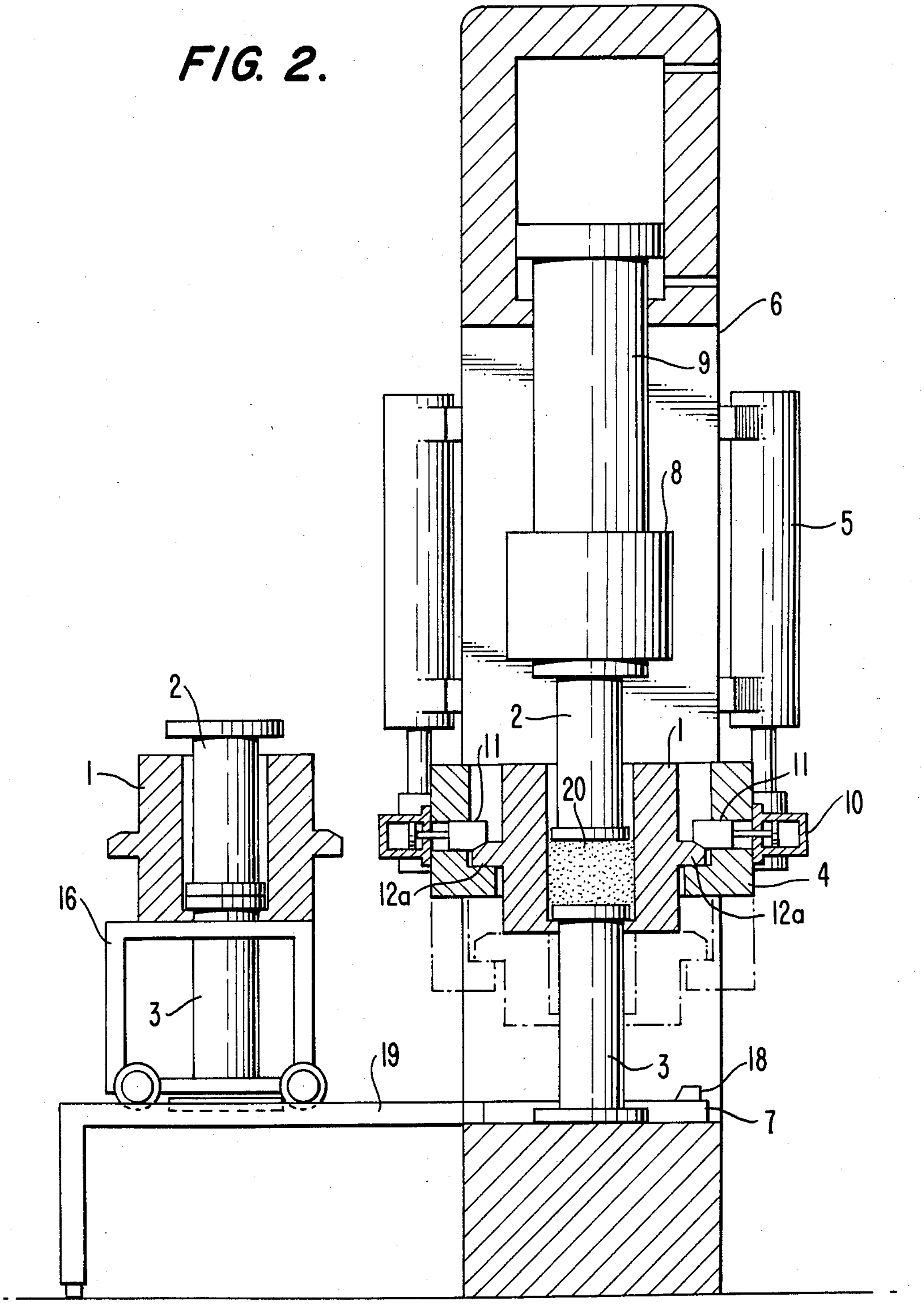
FIG. 2 is a side elevation of another embodiment also partially in cross-section.
Figure 3:
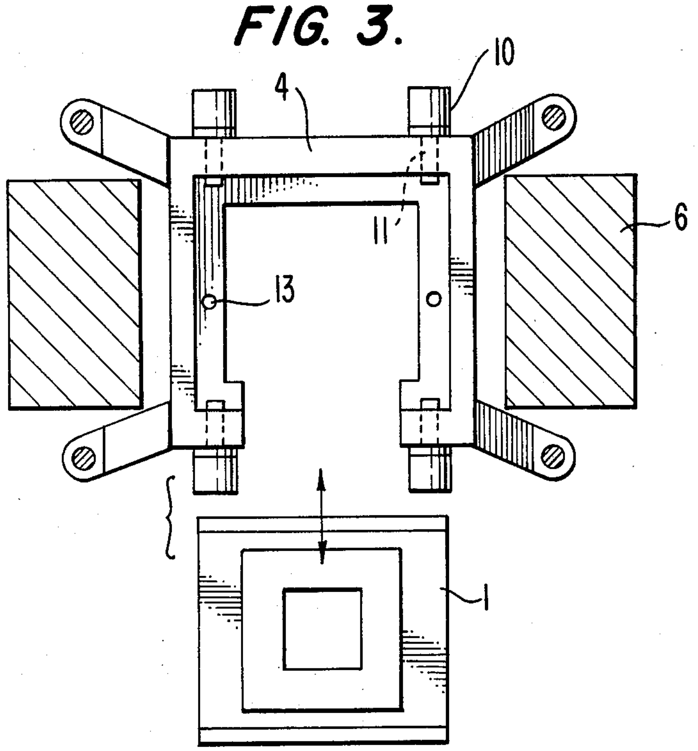
FIG. 3 is a cross section of FIG. 1 on the line III—III.
Figure 4:
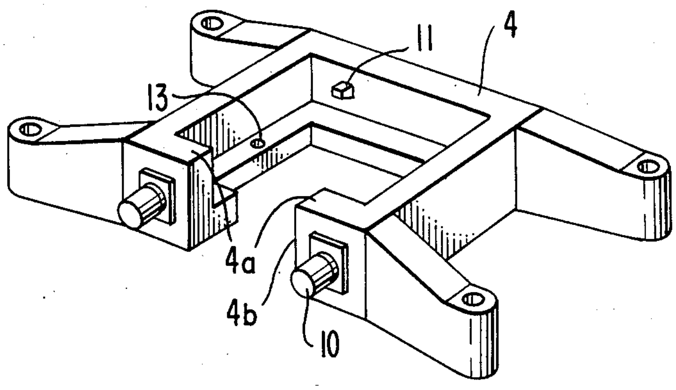
FIG. 4 is a perspective view of the whole metallic mold support.

In FIG. 1, FIG. 2 and FIG. 3, the metallic mold (1) receives brick material supplied into it and it sits on the metallic mold support (4). The upper plunger (2) is driven by the hydraulic cylinders (9) mounted on the upper frame 6 of the machine through the pusher block (8) to press the material downwards in the metallic mold (1) between itself and the lower plunger (3) that is stationary. There are holes (13) in the bottom face of the metallic mold support (4), and protruding pins (12) of the metallic mold fit into the holes (13) to position the metallic mold (1) properly. In the embodiment of FIG. 2 there are two pairs of wedges (11) provided in front of and at the back of the metallic mold (1). Those wedges are driven by hydraulic cylinders (10) to advance and retreat. When they advance they engage the inclined faces of the protrusions on the front and rear sides of the metallic mold (1), so as to fix it by pressing it down.

In the embodiments of the invention in FIG. 1 and FIG. 2, the metallic mold (1), and plungers (2) and (3) are of such dimension as to form a set of components fitted together, and they are as a whole movable in and out of the metallic mold support (4) rapidly as described below, which saves time in changing the metallic mold (1) and plungers (2) and (3) in the conventional forming machines for bricks, etc.

In a preferred embodiment of the invention, the metallic mold support (4) is shaped a square frame with its one side open like the letter U laid flat on its face. The metallic mold (1), upper and lower plungers (2) and (3) form a combination of components put together beforehand in the operation of the machine and they are placed inside the metallic mold support (4), and after the forming operation they are withdrawn through the opening. At the position of the metallic molds support (4) as shown by the broken lines in FIG. 1, the protrusions of the metallic mold (1) are above it and the upper and lower plungers (2) and (3) which have in common the center line of the metallic mold (1) and the metallic mold (1) can freely move on a transfer truck (16) in the direction perpendicular to the sheet of paper of the figure. When the metallic mold support (4) is raised, the bottom flange of the metallic mold support (4) will contact the protrusions of the metallic mold (1).

Figure 5:
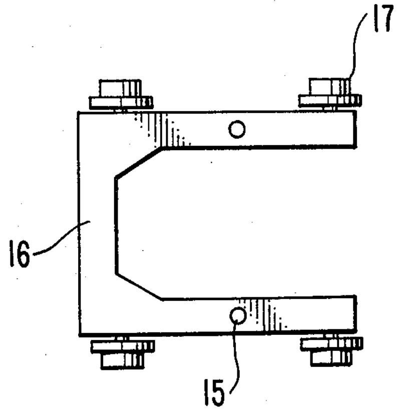
FIG. 5 is a plan view of the metallic mold transfer truck.

On the other hand in FIG. 1 and FIG. 2 the transfer truck (16) has upward protruding pins (15), and they fit into the holes (14) of the metallic mold (1) to position it correctly. The lower end of the transfer truck (16) has rollers (17), which roll back and forth on the transfer rails (19) and the positioning rails (7). The transfer truck is also shaped as shown in FIG. 5 like the letter U laid flat on its face to give an opening for the lower plunger (3) to pass through.

According to the construction of the preferred embodiments in FIG. 1 and FIG. 2 and above described, a metallic mold (1) and upper and lower plungers (2) and (3) to replace a previously removed set move on the transfer truck (16) through the opening of the U-shaped metallic mold support (4) into the metallic mold support (4) and their center line is aligned with the center line of the metallic mold support (4) and the transfer truck (16) stops at the correct position by coming against the stop (18) placed on the positioning rails (7).

Next, the metallic mold support (4) is raised by the hydraulic cylinders (5). In the ascending of the metallic mold support (4), the engagement of the pins (12) and the holes (13) guides the protrusions of the metallic mold (1) to place it correctly on the metallic mold support (4). With further ascending of the metallic mold support (4), the metallic pattern (1) and the upper and lower plungers (2) and (3) are lifted off the transfer truck (16), and the truck (16) is shifted to the left in FIG. 2 out of the machine.

The metallic mold (1) on the support (4) is fastened to it by the advance of the hydraulic cylinders (10) and wedges (11), and after this the metallic mold support (4) is lifted up to mount the upper plunger (2) on the pressure block (8). Then the metallic mold support (4) is lowered until the bottom of the lower plunger hits the bottom face of the frame (6). With the lower plunger (3) on the frame (6), the former is fixed on the latter with the bolts, etc. This concludes the installation of a new metallic mold and the plungers. The removal of the metallic mold (1) from the machine follows the steps as described above for the installation of a new one in the reverse order.

It can be easily seen that it is not an easy task to move the metallic molds (1) and upper and lower plungers (2) and (3) individually avoiding interference with the body of the machine and to position them correctly at the prescribed places. On the other hand the merits listed below are obtainable according to the invention:

1. The metallic pattern and the upper and lower plungers are assembled with their center lines in alignment at a place out of the machine.
2. Positioning of the metallic mold and upper and lower plungers can be effected automatically and accurately.
3. The fastening of the upper and lower plungers to the frame with bolts is simple.

The invention provides an improved forming machine for bricks, etc. which has shown significant benefits in actual operation.

We claim:

1. A machine for forming bricks, comprising:

a horizontal mold support having an open center and one side open;

support moving fluid pressure cylinders on which said mold support is mounted for vertical movement in said machine;

an upper fluid pressure cylinder above said open center for exerting a downward thrust;

replaceable sets each consisting of an upper plunger, a metallic mold having an open upper end into which said plunger fits for compressing brick material within said mold and an open lower end, and a lower plunger which fits into the open lower end of said mold for compressing brick material within said mold, an upper plunger, metallic mold and lower plunger when in position in said machine being aligned vertically with said upper fluid pressure cylinder, and having said mold removably held within said mold support, and said lower plunger having a diameter less than the open side of said mold support for being movable out of said mold support through said open side;

whereby when said replaceable set is positioned in said machine, the upper fluid pressure cylinder can press the plungers downwardly with said lower plunger against the bottom of the machine, and said support moving fluid pressure cylinders can move said mold support with said mold relative to said plungers, and when it is desired to replace said set, said mold support can be moved downwardly until said open side is aligned with said lower plunger, and said set can be moved laterally out of said mold support and be replaced by a set of a different mold and an upper and a lower plunger.

2. A machine as claimed in claim 1 in which said mold support has a ledge around the inside thereof, and said mold has laterally projecting portions which, when the mold is in said mold support, rest on said ledge, and laterally movable wedges in said mold support movable laterally to engage the upper sides of said laterally projecting portions on said mold for holding said mold tightly in said mold support.

* * * * *